United States Patent [19]

Yun

[11] Patent Number: 4,507,524

[45] Date of Patent: Mar. 26, 1985

[54] LOUDSPEAKER TELEPHONE SYSTEM

[75] Inventor: Jin H. Yun, Seoul, Rep. of Korea

[73] Assignee: Gold Star Tele-Electric Co., Ltd., Inc., Seoul, Rep. of Korea

[21] Appl. No.: 358,965

[22] Filed: Mar. 17, 1982

[30] Foreign Application Priority Data

Mar. 18, 1981 [KR] Rep. of Korea .................. 892/1981
Mar. 18, 1981 [KR] Rep. of Korea .................. 893/1981
Mar. 18, 1981 [KR] Rep. of Korea .................. 894/1981

[51] Int. Cl.³ .............................................. H04M 1/60
[52] U.S. Cl. ............................... 179/81 B; 179/100 L
[58] Field of Search ............... 179/81 R, 81 B, 100 L; 381/110

[56] References Cited

U.S. PATENT DOCUMENTS

| | | | |
|---|---|---|---|
| 3,751,602 | 8/1973 | Breeden | 179/81 B |
| 3,833,766 | 9/1974 | Eklof et al. | 179/81 B |
| 3,899,643 | 8/1975 | Tabalba | 179/81 B |
| 3,902,023 | 8/1975 | Lindgren | 178/81 B |
| 3,952,166 | 4/1976 | Kato et al. | 179/81 B |
| 4,025,728 | 5/1977 | Jacobson | 179/81 B |
| 4,304,969 | 12/1981 | Walla | 179/81 B |
| 4,376,876 | 3/1983 | Versteeg et al. | 179/81 B X |

FOREIGN PATENT DOCUMENTS 5469308 11/1977 Japan .

OTHER PUBLICATIONS

Kato et al, "Model S-1P Loudspeaker Telephone Circuit Design", vol. 27, Review of the Electrical Communication Laboratories, pp. 347-357, May–Jun. 1979.

Primary Examiner—Keith E. George
Attorney, Agent, or Firm—Blum Kaplan Friedman Silberman & Beran

[57] ABSTRACT

A loudspeaker telephone system is comprised of a voice switching circuit, hybrid, and power supply circuit. The voice switching circuit includes comparators for comparing speech through the main paths with a side tone through auxiliary paths, time constant circuits for controlling exponentially a pair of variable gain amplifiers for making or breaking the sending and receiving signals, and band pass filters arranged in each input of the comparators for rejecting indoor noise as well as the line noise coming into the loudspeaker telephone system through the lines. Accordingly, the howling effect between microphone and loudspeaker is negligible; transfer from a sending mode to a receiving mode is easily made while maintaining naturalness of the voice. By inclusion of impedance matching elements in a conventional hybrid, the hybrid can be used in common either in the present loudspeaker telephone system or in a conventional telephone system. In the loudspeaker telephone system, line current is used as a bias voltage by the power supply circuit; there is no need for providing an additional power supply source.

18 Claims, 7 Drawing Figures

LOUDSPEAKER TELEPHONE SYSTEM

BACKGROUND OF THE INVENTION

This invention relates generally to a loudspeaker telephone system and more particularly to a loudspeaker telephone system having improved voice switching and power supply circuitry. To eliminate the inconvenience of lifting the handset from its cradle in a conventional telephone system, the loudspeaker telephone system has been developed. For an effective loudspeaker telephone system, it is necessary that howling effects occurring between the speaker and the microphone should be reduced close to zero. The quality of the caller's voice should be natural and transfer between the sending mode and the receiving mode, should be readily accomplished. It is also desirable that in the lowdspeaker telephone system, there is no cutting of the speech at the initiation and termination portions thereof during transmission. Also, there should be no distortion of the transmission caused by noises entering the system through the lines as well as those noises occurring naturally indoors where the telephone is located.

In order to minimize the above-mentioned howling effect, a variable loss device and ON/OFF switching device are employed in loudspeaker telephone systems of the prior art. However, during simultaneous transmission there is still a sudden change and distortion of the speech level at the initiation and termination portions thereof. As a result of this change and distortion, the clarity of speech is poor during initiation and termination. In Japanese laid-open Publication No. 54-69308 of Satoshyoichi, a prior art switching circuit for an interphone is shown wherein a J-K flip-flop is constructed for controlling the making and breaking of variable switching elements in the speech paths. Thereby, protection is provided against cutting of the speech at the initial and terminating portions thereof. However, in this Japanese application, a problem remained for maintaining the naturalness of the subscriber's voice because the switching elements in the circuits have linear characteristics. Moreover, the prior art was devised for an interphone requiring four lines and thereby has been used only for a short-distance call having a narrow width of impedance variation while maintaining high sending and receiving levels.

What is needed is a loudspeaker telephone system for a two line system which provides naturalness of speech without cutting of the voice at the initiation and termination thereof and which substantially eliminates howling and other noise effects.

SUMMARY OF THE INVENTION

Generally speaking, in accordance with the invention, a loudspeaker telephone system especially suitable for natural voice transmission and elimination of unwanted noises is provided. The loudspeaker telephone system is comprised of a voice switching circuit, hybrid circuit, and a power supply circuit. The voice switching circuit, controlling the sending and receiving modes, is provided with comparators which compare the speech through the main paths with a side tone on the auxiliary paths. The voice switching circuit exponentially controls the initial and terminating portions of the speech during the transmission thereof. Inverting and non-inverting amplifiers respectively operate in accordance with outputs of the comparators. A pair of variable gain amplifiers make and break the sending and receiving paths, and four band pass filters, arranged in the input lines of the comparators reject noises coming into the loudspeaker telephone system through the lines as well as noises occurring indoors.

In order to protect against cutting off the initial portion of speech and a distortion in the quality of the voice caused by a change of amplification of the variable gain amplifiers when transferring from the sending mode to the receiving mode or vice versa, the rise time of the variable gain amplifiers is set at a fixed value by an RC time constant circuit. The time constant is determined so as not to cut the initial portion of the speech. Also, the fall time of the amplifier is set so as to prevent cutting off at the weak voice level near to the switchover of the sending and receiving modes. Noises caused not only by a voice reverberation in the room but also picked up by the external line, are rejected through band pass filters in each input of the comparators. The band pass filters pass the most significant band width of the voice, that is, 300 Hz to 1500 Hz. By rejecting through the band pass filters the noises having broad frequency spectra, the loudspeaker telephone system is immune from the influence of the above-mentioned noises. Also, by incorporation of impedance matching elements in a conventional hybrid, that is, a circuit which allows use selectively of the loudspeaker telephone system or the conventional handset, the same hybrid can be used in common selectively in either the loudspeaker telephone system or in the conventional telephone system. In the loudspeaker telephone system line current is used as bias voltage, and there is no need to provide an additional power supply for the loudspeaker telephone system per se.

Accordingly, it is an object of this invention to provide an improved loudspeaker telephone system capable of eliminating howling and line noises.

Another object of this invention is to provide an improved loudspeaker telephone system which prevents sudden change and distortion of the voice at the initiation and termination of speech.

A further object of this invention is to provide an improved loudspeaker telephone system which includes a hybrid circuit which is adaptable for a conventional telephone system as well as for a system including a loudspeaker telephone.

Still another object of this invention is to provide an improved loudspeaker telephone system including a power supply circuit using external line current as a source and eliminating a need for an additional power source for the loudspeaker telephone system per se.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
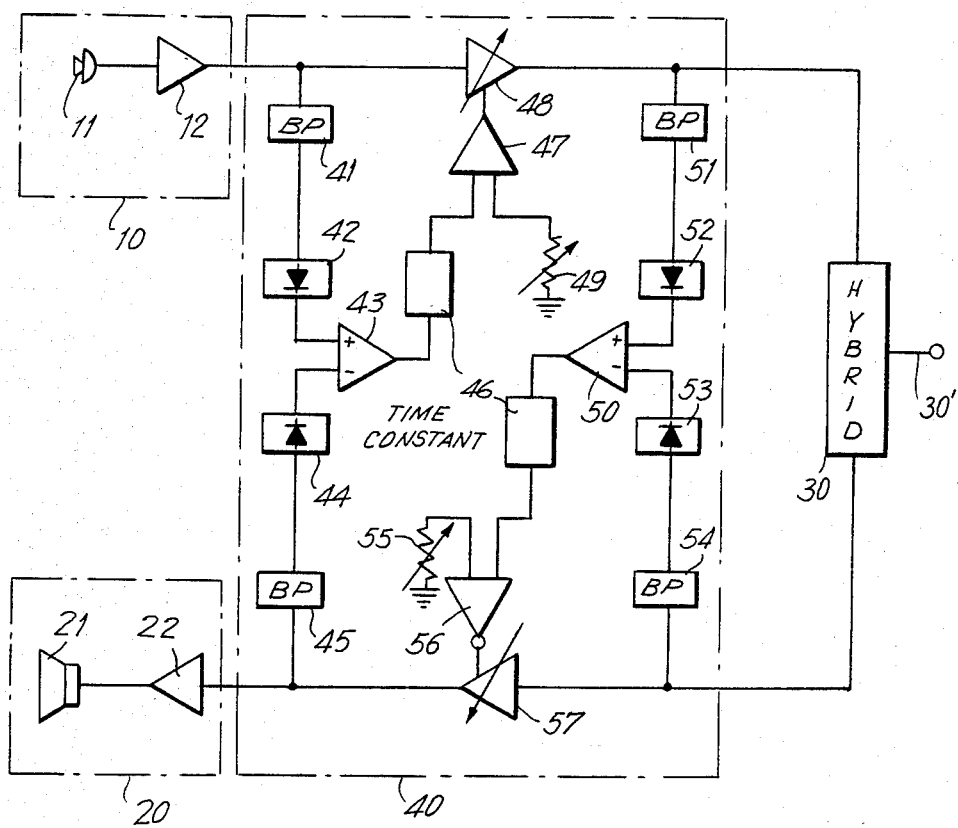
FIG. 1 is a voice switching circuit in a loudspeaker telephone system in accordance with the invention.

FIG. 1 is a voice switching circuit in a loudspeaker telephone system in accordance with the invention. FIG. 1 also functionally shows a hybrid circuit 30 and includes a microphone 10, a loudspeaker 20, and a voice switching circuit 40 in accordance with the invention. The voice switching circuit 40 includes variable gain amplifiers 48,57, band pass filters 41,45,51,54, rectifiers 42,44,52,53, comparators 43,50, time constant circuits 46, non-inverting amplifiers 47, inverting amplifier 56, and variable resistors 49,55.

When a voice signal (FIG. 1) goes to an external line 30' through the microphone 11, preamplifier 12, variable gain amplifier 48 and the hybrid 30, the output of the preamplifier 12 is also coupled to the non-inverting input of the comparator 43 through the noise rejecting band pass filter 41 and rectifier 42. Then, the output of the comparator 43 goes high because during the sending mode the non-inverting input (+) to the comparator 43 is a strong direct tone through the band pass filter 41 and rectifier 42.

On the other hand, the inverting input (−) of the comparator 43 receives a weaker side tone through the variable gain amplifier 48, hybrid 30, variable gain amplifier 57, band pass filter 45 and rectifier 44. The high output of the comparator 43 is input to the amplifier 47 resulting in a high level output from the amplifier 47 which is applied to the variable gain amplifier 48 thereby increasing the gain of the variable gain amplifier 48 for sending the signal from the microphone 11.

The output of the comparator 50 is also high because the signal at the non-inverting input (+) through filter 51 and rectifier 52 is stronger than the signal at the inverting input (−) which is a side tone coming from hybrid 30 through filter 54 and rectifier 53. The output of the comparator 50 is input to the inverting amplifier 56 to produce a low level output from the inverter 56. This low level output is applied to the variable gain amplifier 57 and decreases the gain of the amplifier 57 thereby interrupting the receiving signal going to the loudspeaker 21, Thus, the signal input to the microphone 11 does not appear at the output of the loudspeaker 21.

During the receiving mode when the loudspeaker 21 is outputting, a voice signal from the external line 30' is coupled to the loudspeaker 21 through the hybrid 30, variable gain amplifier 57 and the receiving amplifier 22. At the same time, the receiving signal is coupled to the inverting input of the comparator 50 through the band pass filter 54 and rectifier 53. This input causes the output of the comparator 50 to be at a low level because the non-inverting input of the comparator 50 during the receiving mode is a weaker side tone from the hybrid 30 through the band pass filter 51, and rectifier 52. The direct tone to the inverting input of the comparator 50 is stronger than the side tone to the non-inverting input of the comparator 50. Accordingly, the output of the inverting amplifier 56 goes to a high level, increasing the gain of the variable gain amplifier 57 and thereby passing any sending signal from the external line 30'. The output of the comparator 43, receiving the stronger tone in the inverting input through amplifier 57, filter 45, and rectifier 44, is also at a low level decreasing the sending gain of the variable gain amplifier 48.

Figure 2:
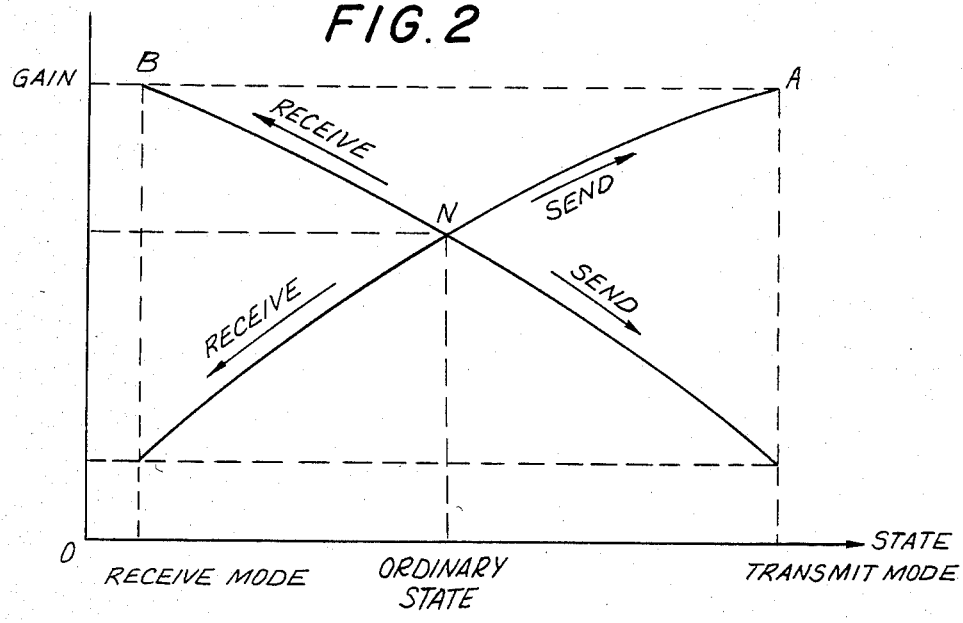
FIG. 2 is a graph of the gain characteristics of variable gain amplifiers in the circuit of FIG. 1.
Figure 3A:
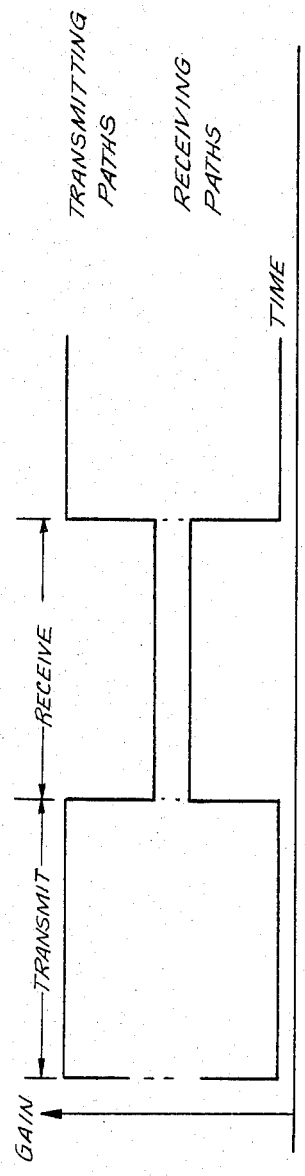
FIG. 3a is a graph of switching element characteristics of the prior art.

The gain changing characteristics of the variable gain amplifiers 48,57 are shown in the graph of FIG. 2. Curve A represents the characteristics of the variable gain amplifier 48 and curve B represents the variable gain amplifier 57. The gain of the ordinary state of the curves A,B can be controlled by adjustment of the variable resistors 49,55, respectively, connected to the second input of the non-inverting amplifier 47 and the inverter 56. As shown in FIG. 3, transfer of the sending mode to the receiving mode is made around the normal state at the intersection N, dropping the gain of the variable gain amplifier 57 during the sending mode and dropping the variable gain of the amplifier 48 during the receiving mode. Further, as indicated in FIG. 2, the responses of the variable gain amplifiers 48,57 are always opposite to each other.

In the sending and receiving modes, the quality of tone has a close relationship to the change of the initial and terminating condition of the speech and the interval between words. Tone quality is also affected by gain difference during the transfer from the sending mode to the receiving mode or vice versa.

This serious problem in a loudspeaker telephone system is solved by the time constant circuit 46, located between the comparator outputs and the inputs to the amplifiers 47,56 in FIG. 1, producing transient characteristic of gain for the amplifiers 48,57 as shown in FIG. 3. During a sending mode, the high intensity of the initial portion of speech is rejected in accordance with an exponential increase in the level of the sending signal from the ordinary state to a high gain state of the amplifier 48 over a short period of time b. Then, the gain of the variable gain amplifier 48 is maintained constant for the period c while the information is being sent. The terminating portion of the speech is exponentially decreased in gain during the period d of transfer from the sending mode to a receiving mode or to a condition where there is neither sending nor receiving.

The time for increasing gain at the initiation of speech is short enough not to cut the initial portion of speech, and the time for reducing gain at termination of speech is long enough not to cut the final portion of speech. The switching is made whenever a voice signal enters into this circuit from the microphone or external line, so that transfer from the receiving mode and the sending is readily made. Especially during a switchover, the gain of opposite paths is decreased exponentially while maintaining the natural voice qualities. For this reason, the natural tone quality of the speech is maintained constant in accordance with the RC time constant of the time constant circuits 46. During the receiving mode the time constant circuits 46 provide the same effect as in the sending mode to prevent cutting of the signal. The time constants circuit 46 can include, for example, a series arrangement of resistance and capacitance and a discharge resistor in parallel with the capacitance.

Figure 3B:
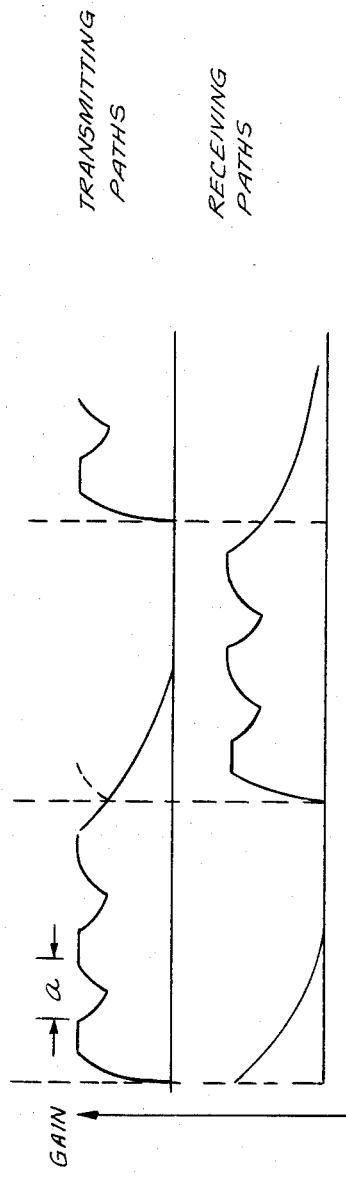
FIG. 3b is a graph of variable gain amplifier characteristics of FIG. 1, and FIG. 3c indicates overlap of transmitting and receiving modes.
Figure 3C:
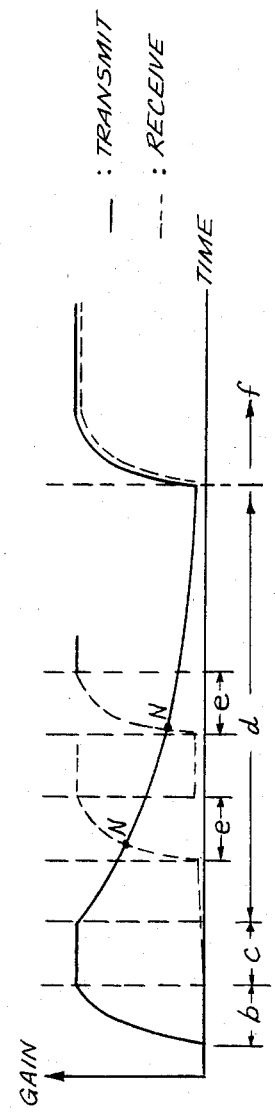

In FIG. 3b, the gain characteristic when switching between words is indicated by the period a, and period e indicates a switchover in simultaneous conversation. The next mode, transmitting or receiving, is indicated at f (FIG. 3c).

Figure 4:
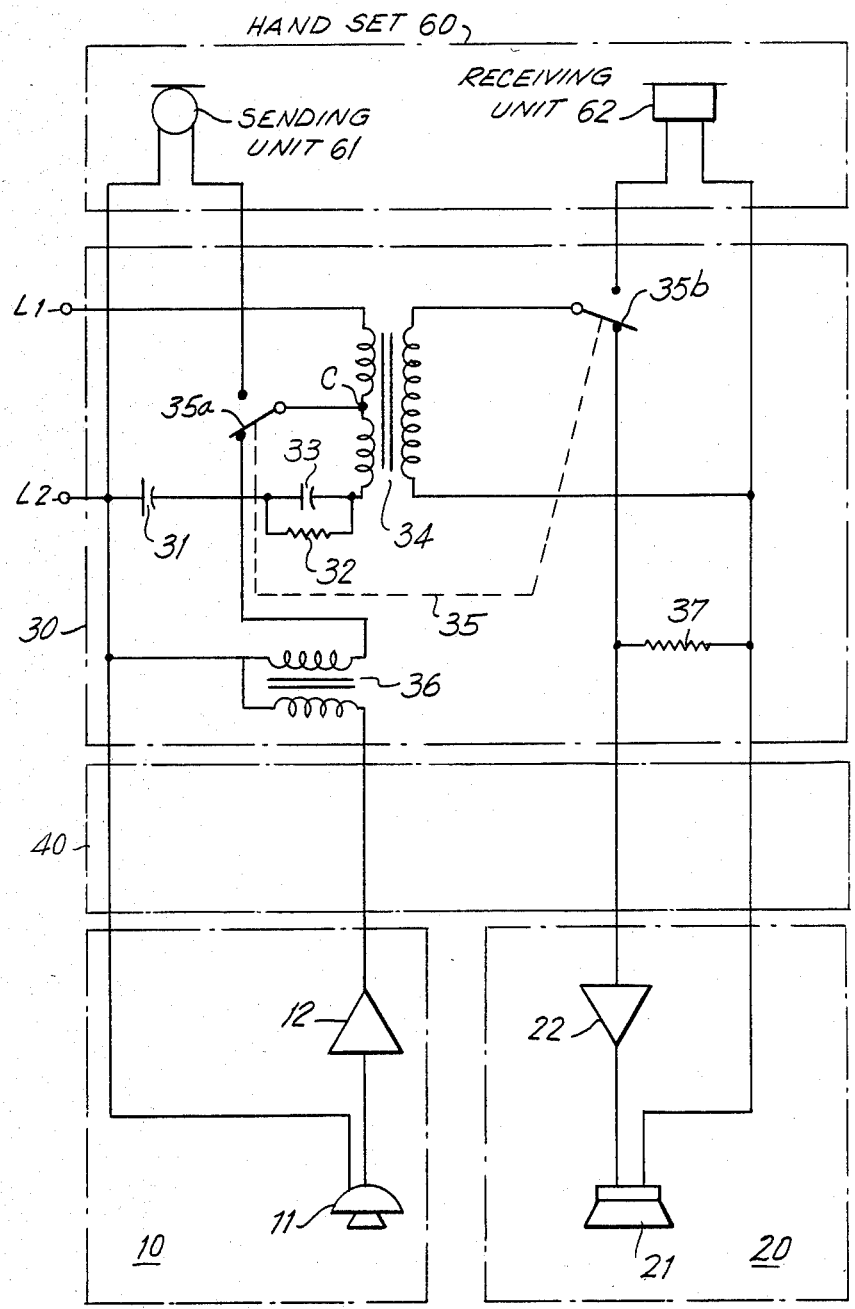
FIG. 4 is a hybrid circuit in accordance with the invention, used in common with a conventional telephone system.

With reference to FIG. 4, there is shown a hybrid 30 in a loudspeaker telephone system in accordance with the invention which can also be used in a conventional telephone system. The hybrid 30 differs from the hybrid circuit in a conventional telephone system only by the inclusion in the circuit of this invention of impedance matching elements 36,37 so as to match the subject switching circuits, microphone and speaker with external lines L1,L2. Also, the non-use connection of the hook switch in the conventional telephone system is used as the switching connection of the circuits 10,20 to a handset 60 in accordance with the on-hook or off-hook condition of the handset 60.

Figure 5:
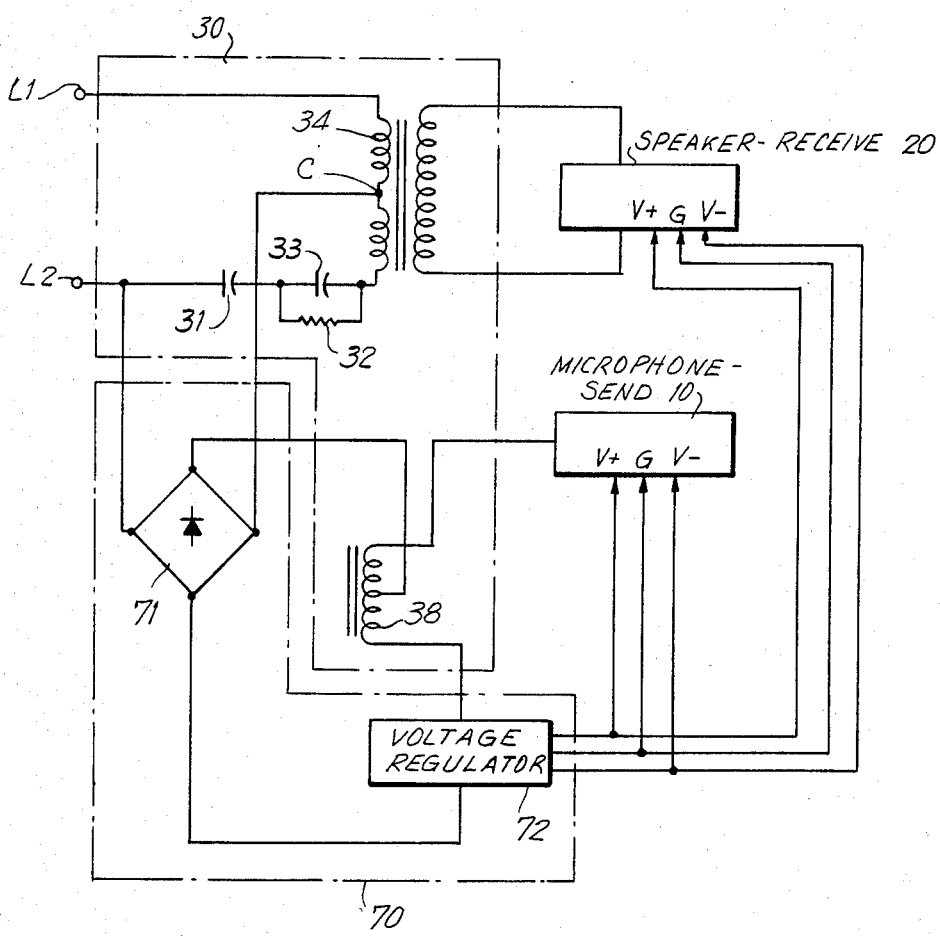
FIG. 5 is a power supply circuit for the loudspeaker telephone system in accordance with the invention.

In FIG. 4, the sending circuit 10 and the receiving circuit 20 are the same as in FIG. 1. The functional block 60 represents a handset and includes a sending unit 61 and a receiving unit 62 which are constructed the same as in a conventional telephone system. A capacitor 31, a resistor 32, a capacitor 33 and an inductor 38 are used to match the impedance between external lines L1, L2 and microphone 10. (FIGS. 4,5). A hybrid 30 can be used in a conventional telephone or in the loudspeaker telephone system in accordance with the invention, and includes an impedance matching coil 36 and a resistor 37. The impedance matching coil 36 is connected between the microphone 11 and the center tap C of a transformer 34 through a connection 35a of a hook switch 35.

The resistor 37 is located between the positive and the negative inputs of the loudspeaker 21 by which the receiving signal through the secondary coil of the transformer 34 and the connection 35b of the hook switch 35 are constantly controlled.

The circuit of FIG. 4 is in the speaker mode, that is, when the subscriber does not lift the handset 60, the circuit is as shown in FIG. 4. Therefore, a sending signal is coupled to the external lines L1,L2 through a microphone 11, preamplifier 12, impedance matching coil 36, and the center tap C in the primary coil of the transformer 34. A receiving signal is coupled to the loudspeaker 21 through the external lines L1,L2, the secondary of the transformer 34 and the receiving amplifier 22.

When the subscriber lifts the handset 60, the connections 35a,35b of the hook switch 35 are changed over to the condition opposite to that shown in FIG. 4 in the manner of a single pole-double throw switch. In this condition, conventional transmission using the headset 60 is possible as with an ordinary telephone.

A power supply circuit for providing rectified and regulated current to the send and receive circuits 10,20 is shown in FIG. 5. The source of this energy is the same lines L1,L2. In FIG. 5, the blocks 10,20 are the sending circuit and receiving circuit respectively in the loudspeaker telephone system in accordance with the invention, and the functional block 70 is a power supply circuit for the sending and receiving circuits 10,20. The power supply circuit 70 includes a bridge rectifier 71 and voltage regulator 72. The bridge rectifier 71 is constructed between the line L2 and center tap C of the transformer 34. Line voltage from the external lines L1,L2 is polarized in the rectifier 71 and is then regulated in the voltage regulator 72, thereby providing regulated voltage to the sending and receiving circuits 10,20.

The voice switching circuit 40 of FIG. 1 is generally indicated with broken lines in FIG. 4 and is omitted from FIG. 5 for the sake of clarity in illustration.

As stated above, because in the loudspeaker telephone system in accordance with the invention, the comparators 43,50 compare the direct tone with the weaker side tone and then pass the direct tone, transmission through the external lines is immune from the influence of a howling effect. Transfer from a sending mode to a receiving mode or vice versa is easily accomplished because switching is made each time a signal comes from the external line or microphone. Tone quality is natural with an exponential change in the speech at the initial and terminating portions thereof in accordance with the time constants of the time constant circuits 46. Moreover, indoor noises and/or external line noises are rejected by the band pass filters 41,45,51,54 in the main and auxiliary paths of the sending and the receiving modes. Further, by placement of impedance matching elements 36,37 in a conventional hybrid circuit, the hybrid circuit can be used either in the loudspeaker telephone system in accordance with the invention, which also operates a conventional telephone system when the handset is lifted, or the hybrid circuit can be used in a purely conventional telephone system without speaker. There is no requirement for an independent power supply source for the loudspeaker telephone system because line current is used to provide operating voltages.

It will thus be seen that the objects set forth above, among those made apparent from the preceding description, are efficiently attained and, since changes may be made in the above construction without departing from the spirit and scope of the invention, it is intended that all matters contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A loudspeaker telephone system having an external signal pair, loudspeaker, microphone and handset having a handset microphone and a handset speaker, comprising:

power supply means for powering the loudspeaker telephone system from the external signal pair;

hybrid circuit means, powered by the external signal pair, for matching a signal on the external signal pair to one of the handset microphone, handset speaker, microphone and the loudspeaker, and vice versa; and voice switching means for selecting a signal path between the external signal pair and the microphone and the external pair and the loudspeaker, said voice switching means including band pass means for rejecting indoor noises and line noise; comparator means for determining whether a signal has been received from the microphone or the external signal pair and generating a send signal or a receive signal respectively, in response; time constant means for exponentially controlling the rise and fall of the send and the receive signals; and variable gain means, for variably amplifying signals from the microphone and the external signal pair, said variation in amplification being controlled by the send and the receive signal;

whereby the exponential rise and fall of the send and receive signals caused by the time constant means causes an exponential variation in gain of the variable gain means.

2. The loudspeaker telephone system of claim 1 wherein the power supply means comprises a bridge rectifier and a voltage regulator connected to the external signal pair, the external signal pair being the source of the power used to operate the loudspeaker telephone system.

3. The loudspeaker telephone system of claim 1 wherein the band pass means consists of of band pass filters positioned to filter all inputs to said comparator means.

4. The loudspeaker telephone system of claim 3 wherein said band pass filters pass signals within the frequency range 300–1500 Hz.

5. The loudspeaker telephone system of claim 1 wherein the comparator means comprises a first comparator and a second comparator, said first comparator is adapted to determine if there is a signal on the external pair; and said second comparator is adapted to determine if there is a signal from the microphone.

6. The loudspeaker telephone system of claim 5 wherein the inputs to the comparators are passed through band pass filters.

7. The loudspeaker telephone system of claim 5 wherein the send signal is generated by the second comparator when the second comparator determines that there is a signal from the microphone present; and the receive signal is generated when said first comparator determines that a signal from the external signal pair is present.

8. The loudspeaker telephone system of claim 1 wherein the time constant means comprises a RC circuit, the resistor and the capacitor values being selected to produce a time constant for the RC circuit which is short enough to prevent the loss of the beginning of a transmitted signal from one of the microphone and the external line pair and so that the fall time of the signal through the resistor capacitor circuit is long enough so as not to cut off the end of a communication from one of the microphone and the external line pair.

9. The loudspeaker telephone system in claim 1 wherein the variable gain means comprises a pair of variable gain amplifiers, wherein the gain of said variable gain amplifiers is controlled by the output of said time constant means.

10. The loudspeaker telephone system of claim 1 wherein said hybrid circuit is used for both a speaker phone and conventional telephone.

11. The loudspeaker telephone system of claim 1 wherein the hybrid circuit means comprises a transformer having a primary coil and a secondary coil, said primary coil having a center tap, an inductor, connected between the microphone and the center tap of the primary coil and a resistor connected in parallel between the loudspeaker and the secondary coil of the transformer; whereby the inductor and the transformer are used to match the impedance of the external signals to the voice switching circuit when a send signal is generated and the resistor and the transformer are used to match the impedance of the external signal pair to the loudspeaker when a receive signal is generated.

12. The loudspeaker telephone system of claim 1 wherein the hybrid circuit means is connected to the handset speaker and the handset microphone when the handset is off-hook and is coupled to the loudspeaker and microphone when the handset is on-hook.

13. A loudspeaker telephone system having an external signal pair, a loudspeaker, a microphone and a handset having a handset hook switch with on-hook and off-hook positions, handset microphone and a handset speaker, comprising:

hybrid circuit means selectively connecting the external signal pair with one of the microphone and loudspeaker when said handset hook switch is on-hook and connecting the external signal pair with said handset microphone and handset speaker when said handset is off-hook;

power supply means for supplying power to said loudspeaker telephone system by utilizing the external signal pair as a power source; and voice switching means for preventing howling and for providing a natural voice reproduction in said loudspeaker telephone system and switching said loudspeaker telephone system from a send mode to a receive mode and vice versa, said voice switching means having a send path and a receive path, said voice switching means comprising comparator means for comparing a signal through the send path with a signal through the receive path and generating a send signal or a receive signal in response to the comparison, time constant means exponentially varying the rise and fall times of both said send and said receive signals from said comparator means, and variable gain means exponentially increasing said send path signal and exponentially decreasing said receive path signal in response to exponentially varied send signals from said time constant means when the loudspeaker telephone system is in the send mode and exponentially increasing said receive path signal and exponentially decreasing said send path signal in response to exponentially varying receive signals from said time constant means when the loudspeaker telephone system is in the receive mode.

14. The loudspeaker telephone system of claim 13 wherein said hybrid circuit means comprises a transformer including a primary coil with a center tap and a secondary coil with a hook switch contact connected to one end of said secondary coil, said primary coil having a hook switch contact connected to said center tap; an inductor connected between said microphone and said hook switch contact of said primary coil and used to match the impedance of said external line to said voice switching means when a send signal is generated; and a resistor connected in parallel between said loudspeaker and said secondary coil of said transformer which is used to match the impedance of said external signal pair to said loudspeaker when a receive signal is generated, said hybrid circuit means being coupled to said handset speaker and said handset microphone when said hook switch contacts are connected to said handset, and to said voice switching means when said hook switch contacts are connected to said inductor and said resistor.

15. The loudspeaker telephone system of claim 14, wherein said power supply means comprises a rectifier coupled between one member of said external signal pair and said primary coil center tap of said transformer and a regulator for controlling a rectified voltage from said rectifier and providing a constant voltage to said loudspeaker telephone system through said transformer utilizing the external signal pair as a power source.

16. The loudspeaker telephone system of claim 13, wherein said comparator means comprises a first comparator having an inverting input and a non-inverting input, for comparing a send path signal with a receive path signal, said first comparator generating a send signal or a receive signal to control the gain of said send path in response to the comparison, said send path signal being input to the non-inverting input of said first comparator, said receive path signal being input to the inverting input of said first comparator; and a second comparator having an inverting input and a non-inverting input for comparing the send path signal with the receive path signal, and generating a send signal or a receive signal to control the gain of said receive path in response to the comparison, said send path signal being input to the non-inverting input of said second comparator, said receive path signal being input to the inverting input of said second comparator.

17. The loudspeaker telephone system of claim 16, wherein said time constant means comprises a first time constant circuit exponentially varying said rise time of said send signal from said first comparator to be short enough not to cut off the initial portion of said send path signal when the loudspeaker telephone system is in the send mode and exponentially lengthening said fall time of said receive signal from said first comparator so that the terminating portion of said send path signal, when the loudspeaker telephone signal is in the receive mode, is not cut off; and a second time constant circuit exponentially shortening said rise time of said send signal from said second comparator so that the initial portion of said receive path signal, when the loudspeaker telephone system is in the receive mode, is not cut off and exponentially lengthening said fall time of said receive signal from said second comparator so that the terminating portion of said receive path signal, when the loudspeaker telephone system is in the receive mode, is not cut off.

18. The loudspeaker telephone system of claim 17, wherein said voice switching means further switches to an ordinary state mode, wherein said variable gain means comprises a sending variable gain amplifier exponentially varying the gain of said send path signal in response to exponentially varied send and receive signals from said first time constant circuit and providing said send path signal with ordinary state gain when said voice switching means is in neither the sending mode nor the receiving mode; and a receiving variable gain amplifier exponentially varying the gain of said receive path signal in response to exponentially varying send and receive signals from said second time constant circuit and providing said receive path signal with an ordinary state gain when said voice switching means is in neither the sending mode nor the receiving mode.

* * * * *